J. C. BONNER.
ROAD VEHICLE.
APPLICATION FILED MAR. 23, 1918.
1,333,290.
Patented Mar. 9, 1920.
5 SHEETS—SHEET 5.
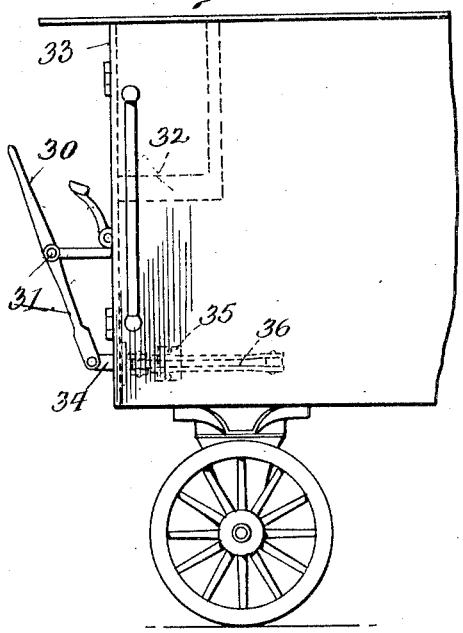
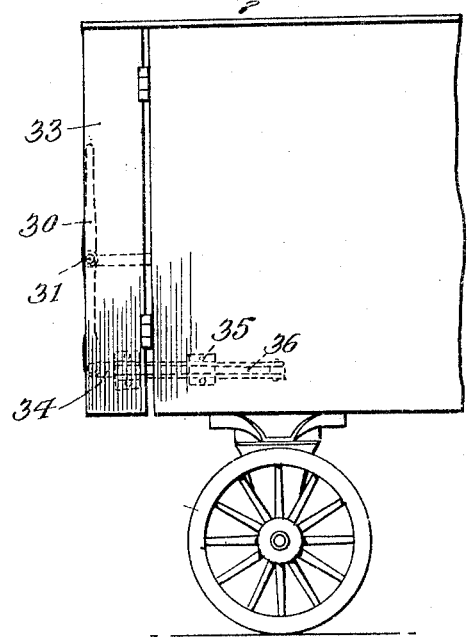
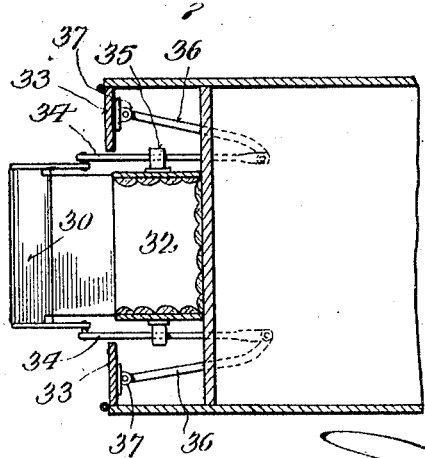
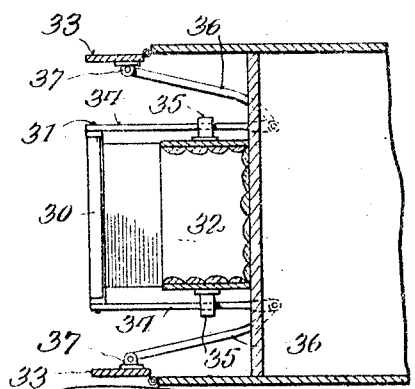

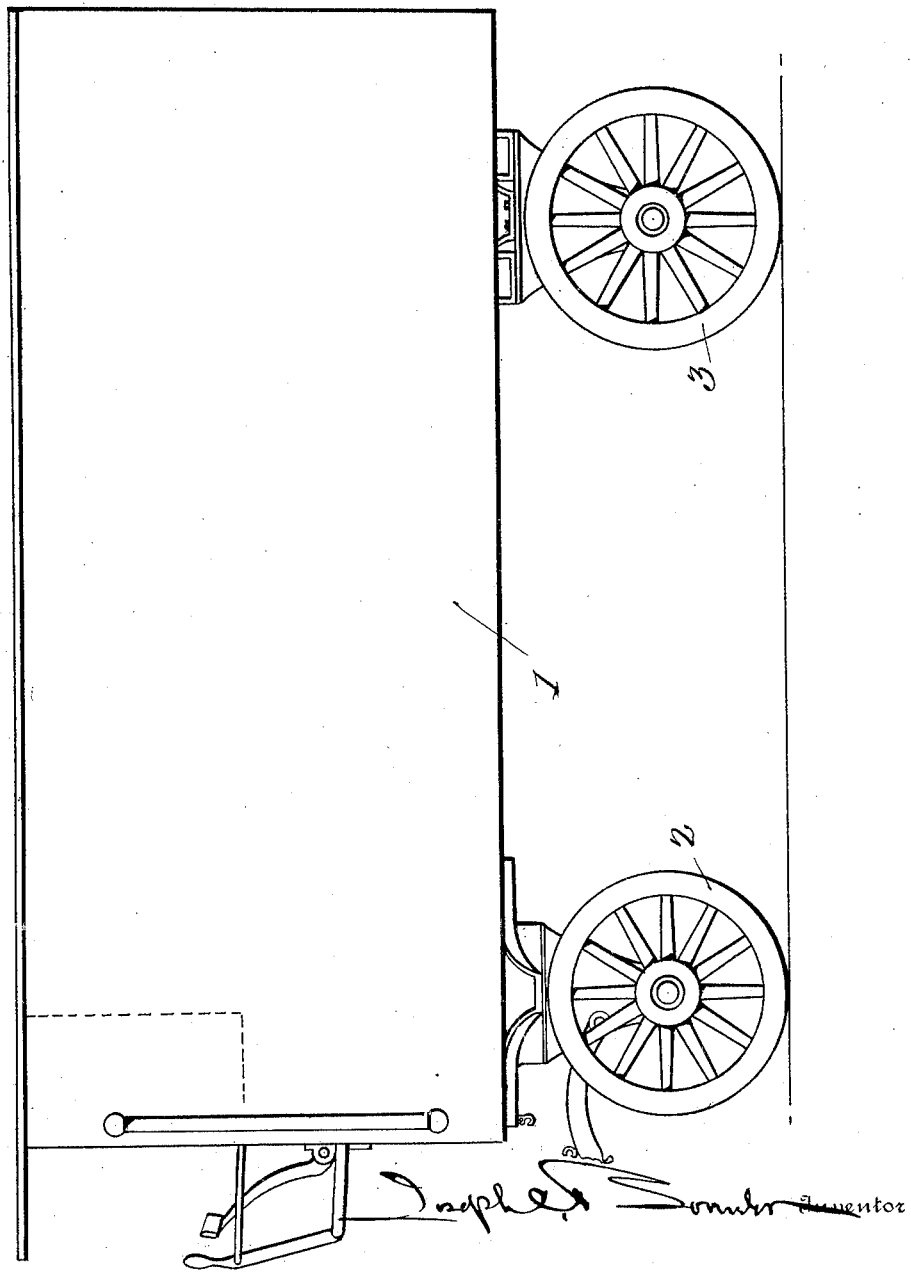

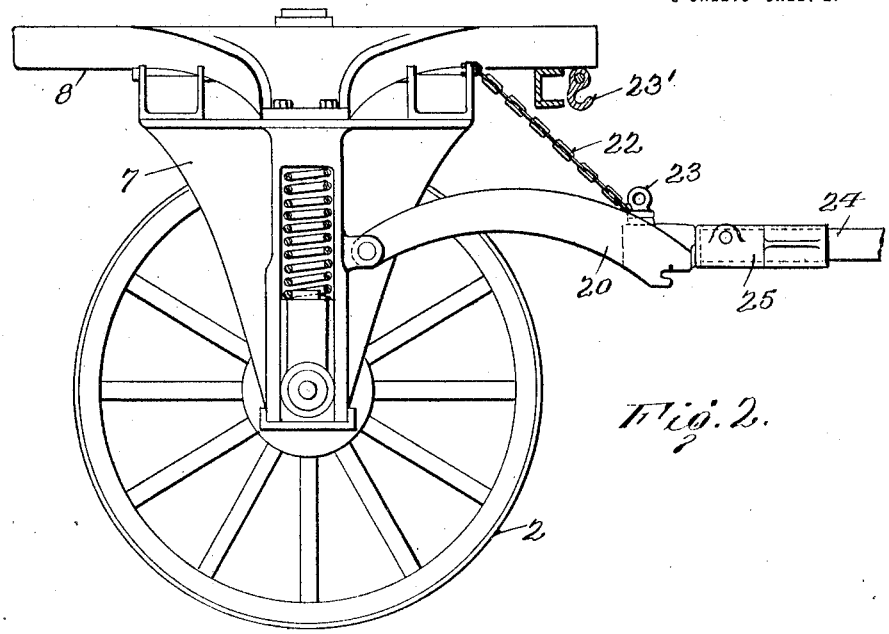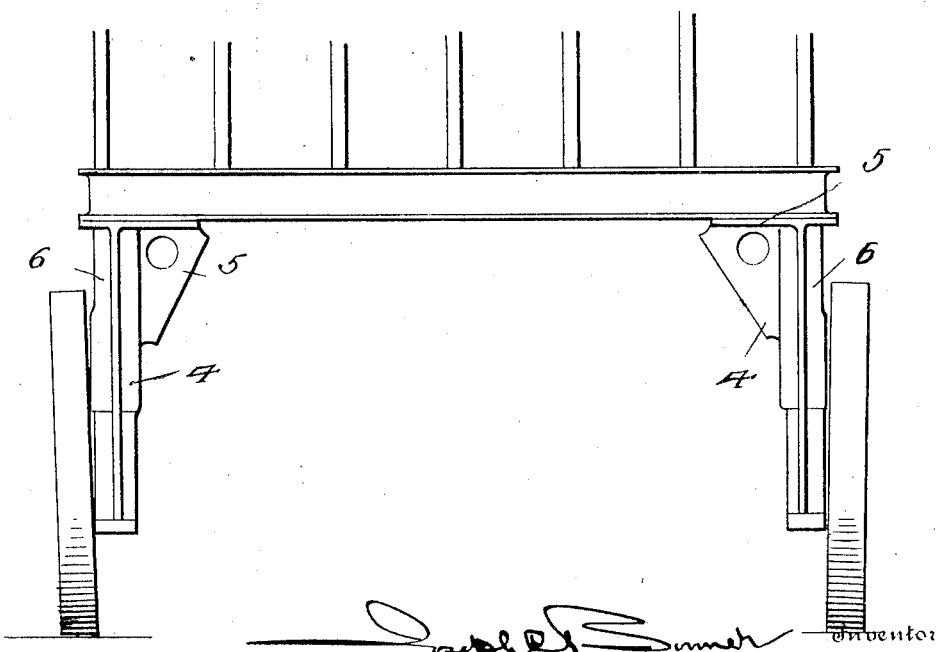

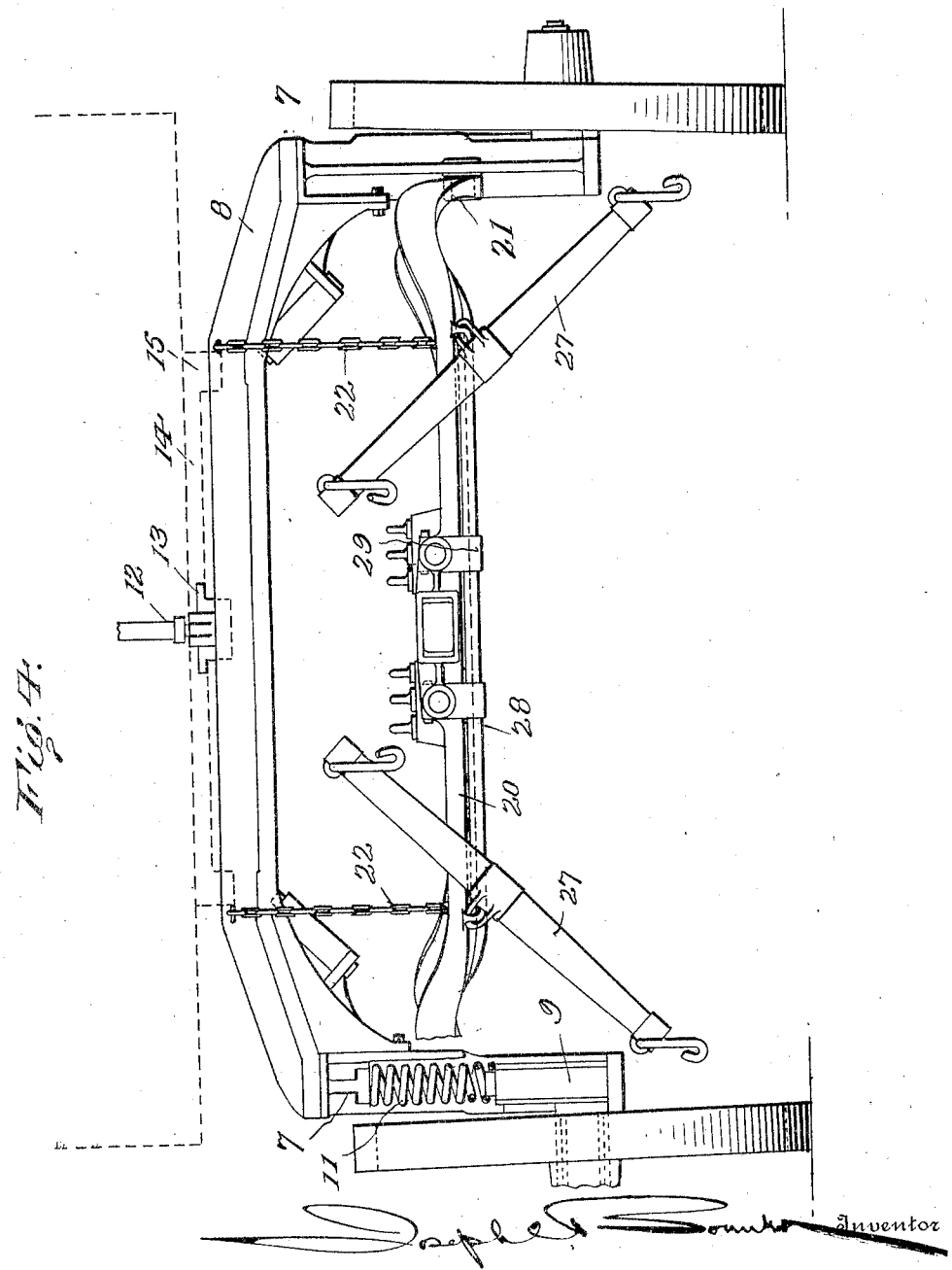

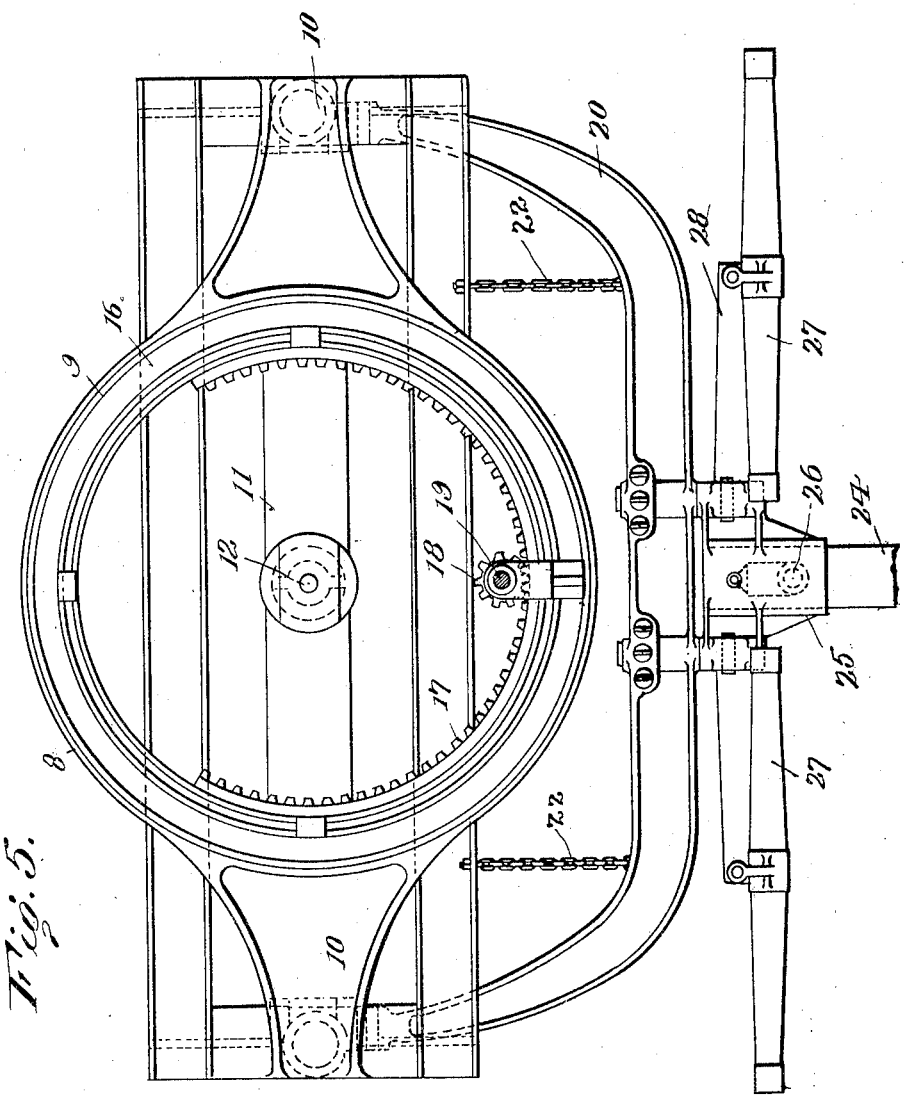

UNITED STATES PATENT OFFICE.

JOSEPH C. BONNER, OF TOLEDO, OHIO.

ROAD-VEHICLE.

1,333,290.    Specification of Letters Patent.    Patented Mar. 9, 1920.

Application filed March 23, 1918. Serial No. 224,261.

*To all whom it may concern:*

Be it known that I, JOSEPH C. BONNER, a citizen of the United States, residing at Toledo, in the county of Lucas and State of Ohio, have invented certain new and useful Improvements in Road-Vehicles, of which the following is a specification.

This invention relates to road vehicles, and it comprises a vehicle having depending wheel supports to provide a clearance space beneath the body of the vehicle, the depending supports being best secured to the body of the vehicle and provided with cushioned blocks, stub-axles mounted in said cushioned blocks, and adapted to receive the wheels of the vehicle, means for steering said vehicle comprising a fifthwheel construction, said fifth-wheel construction advantageously supporting the depending supports for said front wheels and comprising a member secured to the wagon body, but arranged to rotate, and means for revolving said member to turn the wheels, a hound hinged to said fifth wheel construction, and means for securing the hound in raised position; all as more fully hereafter set forth and as claimed.

The question of transportation is a very important one. The major portion of the expense of transportation is in unloading merchandise from one type of vehicle and reloading it in a second vehicle. This is not only costly but it takes time; it causes freight congestion; and is directly responsible for most transportation difficulties. For example, in transporting a manufactured product from the factory in one city to a place of sale in another city, the article is first carried to the freight station in a motor truck, or horse drawn vehicle. There it is removed, placed in a freight car and carried to the other city. It is then removed from the car, generally it is carried to a terminal warehouse, and held until called for by the consignee. Then it must be loaded into another vehicle and delivered. Freight is generally loaded and unloaded by hand, and this is a costly operation. It is also slow, and it causes serious difficulties when a large amount of freight has to be handled.

In another application Serial No. 867,865 filed October 21, 1914, Patent No. 1,280,140 Oct. 1, 1918, I have described and claimed a transportation system in which a plurality of vehicles, termed for convenience road wagons, are arranged to straddle the top of a carrying vehicle. In the present application, I do not claim this system of transportation, but I do claim the construction of said road wagons.

In the present invention I provide a vehicle provided with a clearance space beneath the body, and provided with steering means. The usual cross-axles are eliminated and stub-axles are employed. These stub axles are mounted in cushioned blocks secured in depending supports. The supports for the rear wheels are fastened to the body of the wagon. I further provide a novel type of fifth wheel construction to permit the front wheels to turn and to preserve this clearance space beneath the body of the vehicle.

In the present invention I provide a vehicle which is capable of moving over ordinary roads on its own wheels, and which is provided with steering means. This vehicle may be, and generally is, a horse drawn vehicle, although any type of motive power may be employed in connection therewith. The vehicle is constructed to provide a clearance space beneath the body; or, in other words, the cross axles and underframing are replaced by depending wheel supports and stub axles, so as to leave the space beneath the body entirely clear. The vehicle is provided with a hinged hound for the draft means, and the hound is arranged so that it may be raised to an inoperative position, and secured out of the clearance space.

In the accompanying drawing I have shown an advantageous embodiment of this invention. In this showing Figure 1 is a side elevation of my improved vehicle;

Fig. 2 is a side elevation of the fifth wheel construction showing the front wheel, the wagon hound and the draft pole;

Fig. 3 is a partial rear elevation of Fig. 1;

Fig. 4 is a front elevation of the construction shown in Fig. 3;

Fig. 5 is a top plan view of the fifth wheel construction;

Fig. 6 is a side elevation of the forward end of the wagon showing a hinged foot board and means for connecting the foot board to the door of the wagon, this showing illustrating the foot board in extended position and the door closed;

Fig. 7 is a similar view showing the foot board in folded position with the door open;

Fig. 8 is a horizontal sectional view of the construction shown in Fig. 6 and

Fig. 9 is a similar view of the construction shown in Fig. 7.

The vehicle is represented as a whole by the reference numeral 1 and is provided with the usual front and rear wheels numbered 2 and 3 respectively. At the rear of the wagon, and opposite to each other, two depending brackets 4 are secured to the bottom of the body. These brackets may be of any suitable construction and are shown as members having a short arm 5 which is secured to the wagon body and relatively longer arm 6 extending downwardly from the short arms. The long arms carry the rear wheels of the wagon (see Fig. 3).

To permit steering of the vehicle when it is traveling on its own wheels, a special type of fifth wheel construction is employed. The details of this construction are shown in Figs. 2, 4 and 5. Depending supports 7 are secured to the fifth wheel construction, designated as a whole by the reference numeral 8. These supports carry the front wheels. The front and rear wheels are mounted upon the depending supports in the same manner, the construction of which is clearly shown in Figs. 2 and 4. The depending supports are made hollow and receive blocks 9 which carry stub axles 10 upon which the wheels are mounted. A spring 10' is arranged between the block and the upper face of the depending support, which holds the block 9 in proper position and also gives the necessary cushioning effect to the wheels. The fifth wheel construction comprises a circular member 9', which is provided with extensions 11' at each side to which the depending arms are secured. A plate 11 extends across the center of the circular member and receives king bolt 12 which passes through the wagon body and forms a pivot for the fifth wheel construction. Plate 11 may be provided with a bearing member 13 for the king bolt and a race way (not shown) may be arranged in the bearing member and receive any type of roller bearing. A plate 14 is attached to the bottom of the wagon body and is provided with flanged ends 15 which are adapted to ride in the race way 16 in the ring member. This construction provides additional support and adds to the rigidity and strength of the wagon. Any type of anti-frictional bearing may be arranged in the race way 16. The ring member is provided with internal gear teeth 17 which are adapted to mesh with a pinion 18 carried by a steering post 19. The steering post extends up to the driver's seat and is provided with any type of steering handle.

The vehicle is provided with means for permitting it to be drawn by horses and the draft means are so arranged that they can be folded out of the way when the vehicle is loaded on the carrying vehicle and again brought into play when needed. In order to obtain this result the hounds 20 are hinged to the depending supports at 21. The usual chains 22 are connected to the hounds and to the wagon body and made of sufficient length to allow the hounds to assume proper position when lowered. A hook or eye 23 is arranged in the hounds to permit them to be secured to the member 8 of the wagon body when raised. As shown, depending hook 23' is provided for retaining the hound in raised position. The wagon tongue 24 is received in a casting 25 carried by the hounds and held in place by a pin 26. This permits ready removal of the tongue when the vehicle is about to be loaded on to a carrying vehicle. Whiffle trees 27 are carried by the poles 28 which are received in similar sockets 29.

In Figs. 6 to 9 of the drawings I have shown a construction wherein the foot board is hinged and is adapted to fold into a vertical position when a number of the vehicles are loaded on a freight car. The foot board is automatically folded when it comes in contact with the back of a preceding wagon. The foot board 30 is hinged to the wagon body at 31 and arranged in front of the driver's seat 32. The front of the wagon is provided with doors 33 which are closed when the foot board is in extended position. The foot board carries a link or lever 34 which rides in a guide 35 on the side of the seat or wagon body and is connected to another arm or lever 36. The other end of the arm 36 is pivotally connected to the door by means of bracket 37.

As shown in Fig. 1 of the drawings the space beneath the body of the wagon and between the wheels is entirely clear which permits any other type of vehicle such as freight car, a trolley car or an automobile truck to run beneath the body of the wagon and receive the wagon in a straddled position with the wagon wheels overhanging the sides of the car. The fifth wheel construction permits the vehicle to be used as a road wagon drawn by horses, or run by other motive power and also permits the wagon to be steered as is necessary when used as a road wagon. The novel construction of the hound permits the hound to be raised to a position where it does not obstruct the clearance space beneath the body of the wagon and means are provided for securing the hound in raised position. The wagon tongue and the whiffle trees may be readily removed when the wagon is to be loaded on to another vehicle.

When a number of wagons are loaded on a freight car, it is of course desirable to arrange them as close to one another as possible so that the maximum number may be carried on a single car. The hinged construction of the foot board permits it to be turned to a vertical position thereby allowing the wagons to be packed more closely. When the foot board is placed in vertical position the doors 33 are opened as shown in Fig. 9 closing up the space between the front of one wagon and the back of the next and affording a practically continuous side to the "built up car body."

What I claim is:—

1. A vehicle comprising a flat bottomed body and road wheels and having a clearance space extending above the axes of the wheels, an elbow spindle support for the wheels and a depending hollow pedestal, said elbow spindle keyed to slide vertically in said hollow pedestal.

2. A vehicle comprising a flat bottomed body and road wheels and having a clearance space extending above the axes of the wheels, an elbow spindle support for the wheels, a depending hollow pedestal, and a compression spring positioned in said hollow pedestal, said elbow spindle keyed to slide vertically in said hollow pedestal.

3. A vehicle comprising a flat bottomed body and road wheels and having a clearance space extending above the axes of the wheels, an elbow spindle support for the wheels, a depending hollow pedestal, said elbow spindle keyed to slide vertically in said hollow pedestal and a fifth wheel construction, the hollow pedestal for the front wheels being secured to said fifth wheel construction.

4. A vehicle comprising a flat bottomed body and road wheels and having a clearance space extending above the axes of the wheels, an elbow spindle support for the wheels, a depending hollow pedestal, said elbow spindle keyed to slide vertically in said hollow pedestal, a fifth wheel construction whereby steering of the vehicle is accomplished by rotating said fifth wheel.

5. A vehicle comprising a flat bottomed body and road wheels, and having a clearance space extending above the axes of the wheels, an elbow spindle support for the wheels, a depending hollow pedestal, a compression spring arranged in said pedestal, said spindle support being keyed in said pedestal and adapted to slide vertically, and a fifth wheel construction, said hollow pedestal for the front wheels being secured to said fifth wheel construction.

6. A vehicle comprising a flat bottomed body and road wheels, and having a clearance space extending above the axes of the wheels, an elbow spindle support for the wheels, a depending hollow pedestal, a compression spring arranged in said pedestal, said spindle being keyed in said pedestal and adapted to slide vertically, a fifth wheel construction, said hollow pedestal for the front wheels being secured to said fifth wheel construction whereby steering of the wheel is accomplished by rotating said fifth wheel.

7. A vehicle comprising a flat bottomed body and road wheels and having a clearance space extending above the axes of the wheels, an elbow spindle support for each of the wheels, depending hollow pedestals secured to the body, said spindle supports being adapted to slide vertically in said hollow pedestals, and hounds secured to said hollow pedestals at the front of the vehicle.

8. A vehicle comprising a flat bottomed body and road wheels and having a clearance space extending above the axes of the wheels, an elbow spindle support for each of the wheels, depending hollow pedestals secured to the body, compression springs arranged in the hollow pedestals, said spindle supports being adapted to slide vertically in said hollow pedestals, and hounds secured to said hollow pedestals at the front of the vehicle.

9. A vehicle comprising a flat bottomed body and road wheels and having a clearance space extending above the axes of the wheels, an elbow spindle support for each of the wheels, depending hollow pedestals secured to the body, said spindle supports being adapted to slide vertically in said hollow pedestals, hounds secured to said hollow pedestals at the front of the vehicle and a fifth wheel construction arranged at the front of the vehicle, the hollow pedestals for the two front wheels being secured to said fifth wheel construction.

10. A vehicle comprising a flat bottomed body and road wheels and having a clearance space extending above the axes of the wheels, an elbow spindle support for each of the wheels, depending hollow pedestals secured to the body, said spindle supports being adapted to slide vertically in said hollow pedestals, hounds secured to said hollow pedestals at the front of the vehicle and means for retaining the hounds in raised position.

11. A vehicle comprising a flat bottomed body and road wheels and having a clearance space extending above the axes of the wheels, an elbow spindle support for each of the wheels, depending hollow pedestals secured to the body, compression springs arranged in the hollow pedestals, said spindle supports being adapted to slide vertically in said hollow pedestals, hounds secured to said hollow pedestals at the front of the vehicle and means for retaining the hounds in raised position.

12. A vehicle comprising a flat bottomed body and road wheels and having a clearance space extending above the axes of the wheels, an elbow spindle support for each of the wheels, depending hollow pedestals secured to the body, said spindle supports being adapted to slide vertically in said hollow pedestals, hounds secured to said hollow pedestals at the front of the vehicle, a fifth wheel construction arranged at the front of the vehicle, the hollow pedestals for the two front wheels being secured to said fifth wheel construction and means for retaining the hounds in raised position.

In testimony whereof, I affix my signature hereto.

JOSEPH C. BONNER.